United States Patent
Lim et al.

(10) Patent No.: US 8,781,480 B2
(45) Date of Patent: Jul. 15, 2014

(54) HANDOVER METHOD AND APPARATUS IN A WIRELESS COMMUNICATION SYSTEM INCLUDING FEMTO CELLS

(75) Inventors: Chae Gwon Lim, Seoul (KR); Tae Sun Yeoum, Seoul (KR); Sung Ho Choi, Suwon-si (KR); Beom Sik Bae, Suwon-si (KR); Han Na Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 339 days.

(21) Appl. No.: 12/705,278

(22) Filed: Feb. 12, 2010

(65) Prior Publication Data

US 2010/0210268 A1    Aug. 19, 2010

(30) Foreign Application Priority Data

Feb. 13, 2009  (KR) .................. 10-2009-0011891

(51) Int. Cl.
*H04W 36/00* (2009.01)
*H04W 4/00* (2009.01)

(52) U.S. Cl.
USPC ........... 455/444; 455/436; 455/438; 370/331; 370/338

(58) Field of Classification Search
USPC ............... 455/226.1–226.4, 422.1, 404.2, 455/436–444, 434, 446, 456.1–456.6, 411, 455/458, 522; 370/331–333, 252, 310, 338
See application file for complete search history.

(56) References Cited

U.S. PATENT DOCUMENTS

| | | | |
|---|---|---|---|
| 8,072,953 B2 * | 12/2011 | Mukherjee et al. ........... | 370/338 |
| 2004/0264476 A1 | 12/2004 | Alarcon et al. | |
| 2005/0090529 A1 | 4/2005 | McAlpine et al. | |
| 2005/0111389 A1 | 5/2005 | Dick et al. | |
| 2006/0056395 A1 | 3/2006 | Huomo et al. | |
| 2008/0096553 A1 * | 4/2008 | Saksena et al. ............. | 455/426.2 |
| 2008/0132239 A1 * | 6/2008 | Khetawat et al. ............. | 455/438 |
| 2008/0207170 A1 * | 8/2008 | Khetawat et al. ............. | 455/411 |
| 2008/0244148 A1 * | 10/2008 | Nix et al. ...................... | 710/313 |
| 2008/0285492 A1 * | 11/2008 | Vesterinen .................... | 370/310 |

(Continued)

FOREIGN PATENT DOCUMENTS

| | | |
|---|---|---|
| JP | 2008-236727 | 10/2008 |
| JP | 2008-263632 | 10/2008 |
| RU | 2006 117 780 | 11/2007 |
| WO | WO 2008/134281 | 11/2008 |

OTHER PUBLICATIONS

Panasonic, "UE Access Control in CSG Cell", R2-082238, 3GPP TSG RAN WG2 #62, May 5-9, 2008.

(Continued)

*Primary Examiner* — Dwayne Bost
*Assistant Examiner* — Scott Trandai
(74) *Attorney, Agent, or Firm* — The Farrell Law Firm, P.C.

(57) ABSTRACT

A handover method and apparatus for facilitating a handover of a user equipment to a femto cell in a wireless communication system supporting both the femto and macro cells. When a handover condition is detected, the user equipment acquires identity information of a target femto cell base station from system information transmitted by the target femto cell base station, decides whether to handover to the target femto cell base station, based on the identity information; and transmits a measurement report message including the identity information to a serving base station of the user equipment, when the handover is to be made.

23 Claims, 9 Drawing Sheets

(56) References Cited

U.S. PATENT DOCUMENTS

| | | | |
|---|---|---|---|
| 2008/0293418 A1* | 11/2008 | Choksi et al. | 455/436 |
| 2008/0305801 A1* | 12/2008 | Burgess et al. | 455/444 |
| 2009/0003263 A1* | 1/2009 | Foster et al. | 370/328 |
| 2009/0023448 A1* | 1/2009 | Attar et al. | 455/436 |
| 2009/0047960 A1* | 2/2009 | Gunnarsson et al. | 455/436 |
| 2009/0047968 A1* | 2/2009 | Gunnarsson et al. | 455/446 |
| 2009/0061873 A1* | 3/2009 | Bao et al. | 455/436 |
| 2009/0070694 A1* | 3/2009 | Ore et al. | 715/764 |
| 2009/0092078 A1* | 4/2009 | Czaja et al. | 370/328 |
| 2009/0093246 A1* | 4/2009 | Czaja et al. | 455/422.1 |
| 2009/0093252 A1* | 4/2009 | Czaja et al. | 455/436 |
| 2009/0097436 A1* | 4/2009 | Vasudevan et al. | 370/328 |
| 2009/0129327 A1* | 5/2009 | Horn et al. | 370/329 |
| 2009/0135737 A1* | 5/2009 | Vikberg et al. | 370/254 |
| 2009/0163216 A1* | 6/2009 | Hoang et al. | 455/450 |
| 2009/0196253 A1* | 8/2009 | Semper | 370/331 |
| 2009/0305699 A1* | 12/2009 | Deshpande et al. | 455/434 |
| 2009/0323633 A1* | 12/2009 | Burgess et al. | 370/331 |
| 2009/0325583 A1* | 12/2009 | Burgess et al. | 455/444 |
| 2010/0029274 A1* | 2/2010 | Deshpande et al. | 455/435.3 |
| 2010/0113035 A1* | 5/2010 | Eskicioglu et al. | 455/444 |
| 2010/0113038 A1* | 5/2010 | Eskicioglu et al. | 455/446 |
| 2010/0120394 A1* | 5/2010 | Mia et al. | 455/404.2 |
| 2010/0120437 A1* | 5/2010 | Foster et al. | 455/444 |
| 2010/0120447 A1* | 5/2010 | Anderson et al. | 455/456.1 |
| 2010/0124927 A1* | 5/2010 | Eskicioglu et al. | 455/436 |
| 2010/0151852 A1* | 6/2010 | Mori et al. | 455/425 |
| 2010/0151857 A1* | 6/2010 | Brisebois et al. | 455/434 |
| 2010/0157944 A1* | 6/2010 | Horn | 370/331 |
| 2010/0165862 A1* | 7/2010 | Nylander et al. | 370/252 |
| 2010/0167728 A1* | 7/2010 | Venkitaraman et al. | 455/434 |
| 2010/0167740 A1* | 7/2010 | Vakil et al. | 455/436 |
| 2010/0197309 A1* | 8/2010 | Fang et al. | 455/436 |
| 2010/0197311 A1* | 8/2010 | Walldeen et al. | 455/444 |
| 2010/0214956 A1* | 8/2010 | Law et al. | 370/255 |
| 2010/0227627 A1* | 9/2010 | Ishii et al. | 455/456.2 |
| 2010/0240386 A1* | 9/2010 | Hamabe et al. | 455/452.2 |
| 2010/0330994 A1* | 12/2010 | Matsuo et al. | 455/436 |
| 2011/0014894 A1* | 1/2011 | Batkin et al. | 455/410 |
| 2011/0014921 A1* | 1/2011 | Neil | 455/444 |
| 2011/0165878 A1* | 7/2011 | Nylander et al. | 455/436 |
| 2011/0223919 A1* | 9/2011 | Vikberg et al. | 455/436 |
| 2011/0237258 A1* | 9/2011 | Nylander et al. | 455/437 |
| 2011/0243097 A1* | 10/2011 | Lindqvist et al. | 370/331 |
| 2011/0286429 A1* | 11/2011 | Vikberg et al. | 370/331 |
| 2012/0106423 A1* | 5/2012 | Nylander et al. | 370/311 |

OTHER PUBLICATIONS

Ericsson, T-Mobile, "CSG ID Coding", R2-087265, 3GPP TSG RAN WG2 Meeting #64, Nov. 10-15, 2008.

Motorola, "Identification and Measurement of CSG Cells", R2-081114, 3GPP TSG-RAN WG2#61, Feb. 11-15, 2008.

Telecom Italia, ZTE, "Pseudo-CR on Option C for CSG Deployments", C1-082792, 3GPP TSG CT WG1 Meeting #54, Jun. 23-27, 2008.

Huawei, "Routing Handover Request Message to HeNB", R3-090122, 3GPP TSG-RAN WG3#63, Feb. 9-13, 2009.

* cited by examiner

HANDOVER METHOD AND APPARATUS IN A WIRELESS COMMUNICATION SYSTEM INCLUDING FEMTO CELLS

PRIORITY

This application claims priority under 35 U.S.C. §119(a) to an application filed in the Korean Intellectual Property Office on Feb. 13, 2009 and assigned Serial No. 10-2009-0011891, the content of which is incorporated herein by reference.

BACKGROUND OF THE INVENTION

1. Field of the Invention

The present invention relates generally to wireless communication and, in particular, to a handover method and apparatus for facilitating a handover to a femto cell in a wireless communication system including femto and macro cells.

2. Description of the Related Art

A femto cell is a small cellular base station designed to provide short-range coverage of about 10 meters for use in a home or small business and a broadband connection to a core network. Commonly, a femto, cell extends the cellular network coverage indoors, providing users with higher quality and fixed-mobile convergence services.

The $3^{rd}$ Generation Partnership Project (3GPP) considers an environment in which Closed Subscriber Group (CSG) cells and legacy macro cells coexist. Typically, the terms "CSG cell", "femto cell", "CSG cell base station", and "femto cell base station" are synonymously used. In a 3GPP Long Term Evolution (LTE) system, an evolved Node B (eNB) denotes the macro cell base station, and a Home eNB (HeNB) denotes a femto cell base station (or CSG cell base station).

The network architecture designed to support a femto cell enables deployment of a plurality of femto cell base stations and a User Equipment (UE) to measure the signals of the femto cell and macro cell base stations (or eNBs). For a handover between the macro cell eNBs, the UE analyzes a signal transmitted by a handover target eNB to acquire a Physical Cell ID (PCI) and sends a measurement report based on the PCI to a currently serving eNB such that the serving eNB can make a handover decision.

For a handover from a macro cell eNB to a femto cell eNB (i.e., HeNB) or from an HeNB to another HeNB, however, the network must also determine whether the particular UE is permitted to access the target HeNB. Accordingly, there is a need to develop a method for facilitating a handover of a UE to a femto cell (CSG cell or HeNB) in a wireless communication system supporting deployment of femto cells.

SUMMARY OF THE INVENTION

The present invention provides a handover method and apparatus capable of facilitating a handover to a femto cell, considering the mobility of the UE, in a wireless communication system supporting both the femto and macro cells.

In accordance with an embodiment of the present invention, a measurement report method for a handover of a User Equipment (UE) in a wireless communication system including femto cells is provided. The method includes detecting, by the UE, a handover condition; acquiring, by the UE, identity information of a target femto cell Base Station (BS) from system information transmitted by the target femto cell BS; determining, by the UE, whether to handover to the target femto cell BS, based on the identity information; and transmitting, by the UE, a measurement report message including the identity information to a serving BS of the US, when the UE determines to handover to the target femto cell BS.

In accordance with another embodiment of the present invention, a handover apparatus for a wireless communication system including femto cells is provided. The apparatus includes a storage unit that stores an access allowed list including identity information of a femto cell Base Station (BS) permitting access by a User Equipment (UE); a femto cell identity information extractor that retrieves identity information of a target femto cell BS from the access allowed list, when a handover is required; a n access allowed femto cell verifier that verifies the target femto cell BS by receiving identity information of the target femto cell BS and comparing the received identity information with the identity information retrieved from the access allowed list; and a measurement message generator that generates a measurement message and sends the measurement message to a serving BS of the UE, when the target femto cell is verified.

In accordance with another embodiment of the present invention, a method for verifying a femto cell Base Station (BS) to which a User Equipment (UE) attempts a handover in a wireless communication system including femto cells is provided. The method includes receiving, by the femto cell BS, a handover request message including identity information of a target femto cell BS for the handover from a mobility management entity; comparing, by the femto cell BS, the identity information of the target femto cell BS with a current identity information of the femto BS to determine whether the identity information correspond with each other; and accepting, by the femto cell BS, the handover of the UE to the femto cell BS, when the identity information correspond with each other.

In accordance with another embodiment of the present invention, a femto cell Base Station (BS) of a wireless communication system including a plurality of femto and macro cells is provided. The femto cell BS includes a Radio Frequency (RF) unit that receives a handover request message including identity information of a target femto cell BS, the handover request message being transmitted by a mobility management entity; a storage unit that stores cell information of the femto cell BS; a control unit that extracts the identity information of the target femto cell BS from the handover request message; and a cell identity verifier that verifies that the femto cell BS is the target femto cell BS by comparing the received identity information of the target femto cell BS with current identity information of the femto cell BS, and that accepts the handover of the UE to the femto cell BS, when the received identity information of the target femto cell BS corresponds with the current identity information of the femto cell BS.

In accordance with still another embodiment of the present invention, a handover method of a user equipment in a wireless communication system including a plurality of femto cells is provided. The method includes determining, by the UE, that a handover condition is satisfied; sending a measurement report message including identity information of a target femto cell Base Station (BS) from the UE to a serving BS; determining, at the serving BS, a handover to the target femto cell BS; sending a handover required message including the identity information of the target femto cell BS from the serving BS to a mobility management entity; determining, by the mobility management entity, whether to handover the UE to the target femto cell BS; sending a handover request message including the identity information of the target femto cell BS from the mobility management entity to the target femto cell BS, when the mobility management entity determines to handover the UE; comparing, at the target femto cell BS, the identity information included in the handover request message and current identity information of the target femto cell BS; and accepting the handover of the UE to the target femto cell BS, by the target femto cell BS, when the identity information included in the handover request message and current identity information of the target femto cell BS correspond with each other.

BRIEF DESCRIPTION OF THE DRAWINGS

The above and other objects, features, and advantages of the present invention will be more apparent from the following detailed description in conjunction with the accompanying drawings, in which.

DETAILED DESCRIPTION OF EMBODIMENTS OF THE INVENTION

Various embodiments of the present invention are described in detail below with reference to the accompanying drawings. The same reference numbers are used throughout the drawings to refer to the same or like parts. Further, detailed descriptions of well-known functions and structures incorporated herein may be omitted to avoid obscuring the subject matter of the present invention.

Although the embodiments of the present invention will be described below using terms defined in the 3GPP LTE standards, the present invention is not limited thereto.

Additionally, unless otherwise noted, the terms "cell", "base station", and "node B" are used interchangeably herein. Also, the terms "macro cell", "macro cell base station", and eNB" are used interchangeably; and the term "femto cell", "femto cell base station", "femto cell eNB", and "HeNB" are used interchangeably.

Figure 1:
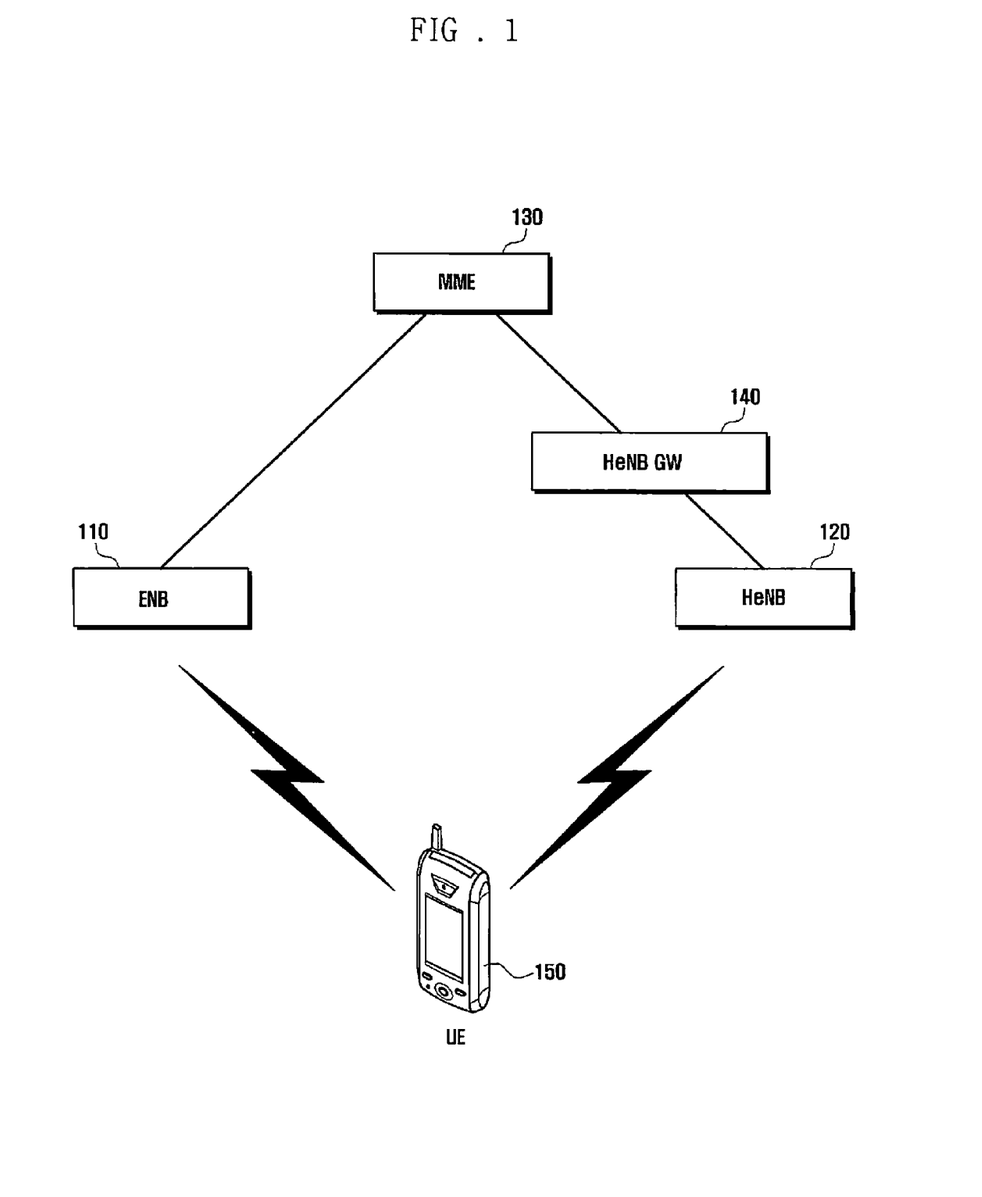
FIG. 1 is a schematic diagram illustrating a wireless communication network according to an embodiment of the present invention.

FIG. 1 is a schematic diagram illustrating a wireless communication network according to an embodiment of the present invention.

Referring to FIG. 1, the wireless communication network includes a macro cell base station (eNB) 110, a femto cell base station (HeNB) 120, a Mobility Management Entity (MME) 130, a HeNB Gateway (HeNB GW) 140, and a UE 150. Additionally, the HeNB GW 140 can be omitted depending on the system implementation.

The eNB 110 is a base station responsible for managing a macro cell. The macro cell is a cell of a typical cellular system and the eNB 110 is the base station managing the macro cell defined by its radio coverage. As indicated above, the terms "macro cell" and "eNB" are used interchangeably herein.

The eNB 110 establishes a wireless channel with the UE 150 and controls radio resources. For example, the eNB 110 broadcasts system information including control information required for the UE 150 to access the eNB 110 and allocates radio resources to the UE 150 for exchanging data and control information. The eNB 110 also collects the channel measurements of a serving cell and neighbor cells that are transmitted by the UE 150, makes a handover determination, and instructs the UE 150 to perform the handover. For this purpose, the eNB 110 is provided with a control protocol such as Radio Resource Protocol (RRC) related to the radio resource management.

The HeNB 120 connects to a core network via a base station controller (not shown) and the HeNB GW 140 to provide the UE 150 with wireless communication services. The HeNB 120 often referred to as a "Closed Subscriber Group (CSG) cell," which permits a specific group of UEs to access a femto cell. The CSG cell is a cellular network deployed in a home, small business, or a specific place to provide an access service to a specific organization. In accordance with an embodiment of the present invention, the HeNB 120 only permits access to previously registered UEs and broadcasts a group identity information, i.e., a CSG ID, in a System Information Block (SIB).

The MME 130 is manages UEs in an idle mode and selects a Packet Data Network (PDN) and Service Gateway (not shown). The MME 130 also is responsible for the roaming and authentication of the UEs.

In accordance with an embodiment of the present invention, the MME 130 stores identity information about femto cell base stations permitting access of a UE in a UE-specific allowed CSG list. The MME 130 can send the UE-specific allowed CSG list to the serving eNB 110 and the UE 150 in separate messages.

The HeNB GW 140 is responsible for connecting the HeNB 120 to the MME 130. As indicated above, the HeNB GW 140 can also be omitted depending on the system implementation.

The UE 150 can connect to the core network via the eNB 110 or the HeNB 120. The UE 150 receives the UE-specific allowed CSG list from the MME 130. The UE 130 acquires identity information of the femto cells (i.e., HeNBs) from the SIB broadcasted by the HeNB 120 and identifies the HeNB 120 by matching the acquired identity information to a CSG ID in the UE-specific allowed CSG list.

The UE 150 can receive the femto cell-specific Physical Cell ID from the eNB 110 or the HeNB 120 and search for the Synchronization Channel (SCH) and perform channel measurements using the femto cell-specific physical Cell ID.

As described above, the wireless communication network according to an embodiment of the present invention is assumed as a cellular system supporting both the eNBs and HeNBs. Although a description will be provided below in which the service base station is an eNB, the present invention is also applicable when the serving base station is an HeNB.

In the description below, a serving base station providing a UE with mobile communication services has information about neighbor femto cells in a Neighbor Relation Table (NRT). The NRT of the serving base station stores the Physical Cell ID (PCI), an Evolved Universal Mobile Telecommunications System (UMTS) Terrestrial Radio Access Network (EUTRAN) Cell Global ID (ECGI), a Tracking Area ID (TAI), a CSG indicator indicating whether the base station is a CSG base station, and information about the CSC ID.

Figure 2:
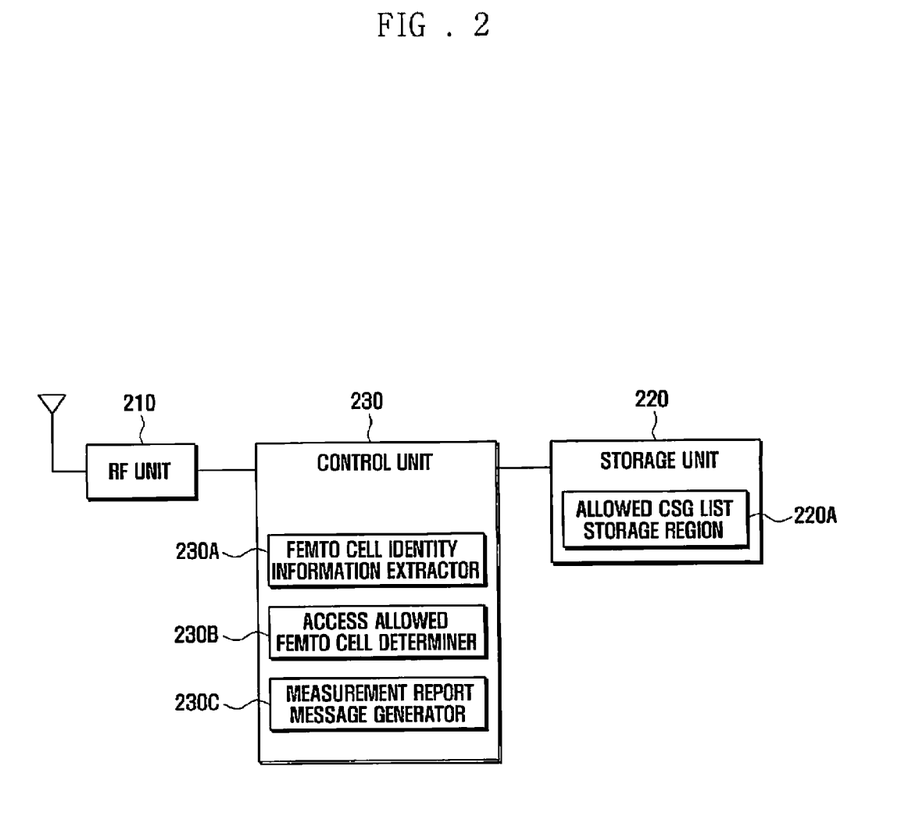
FIG. 2 is a block diagram illustrating a UE according to an embodiment of the present invention.

FIG. 2 is a block diagram illustrating a UE according to an embodiment of the present invention.

Referring to FIG. 2, the UE includes a Radio Frequency (RF) unit 210, a storage unit 220, and a control unit 230. The storage unit 220 includes an allowed CSG list storage region 220A. The control unit 230 includes a femto cell identity information extractor 230A, an access allowed femto cell determiner 230B, and a measurement report message generator 230C.

The RF unit 210 includes an RF transceiver and a duplexer. The RF unit 210 is responsible for processing radio signals transmitted and received by the UE.

The storage unit 220 stores programs and data related to operations of the UE. In accordance with an embodiment of the present invention, the storage unit 220 includes the allowed CSG list storage region 220A. The allowed CSG list includes identity information of femto cell base station to which the UE 150 is permitted to access with the CSG IDs of the access-allowed femto cell base stations. As described above, in accordance with an embodiment of the present invention, the allowed CSG list is transmitted by the MME 130.

The control unit 230 controls the overall operations of the UE 150. Particularly, the control unit 230 can include a data processing unit (not shown) having a transmission data processor and a reception data processor.

The transmission data processor can include a coder for encoding a signal to be transmitted, a modulator for modulating the encoded signal, and a digital/analog converter for converting the modulated signal to an analog signal. The coder can include a data coder for processing packet data and an audio coder for processing audio signal including voice.

The reception data processor can include an analog/digital converter for converting the analog signal received by the RF unit 210 to a digital signal, a demodulator for demodulating the digital signal output by the analog/digital converter, and a decoder for decoding the demodulated signal. The decoder can include a data decoder for processing the packet data and an audio decoder for processing the audio signal including voice.

Further, the control unit 230 includes a femto cell identity information extractor 230A and an access-allowed femto cell determiner 230B.

When a handover to a femto cell is required, the femto cell identity information extractor 230A receives system information transmitted by a target femto cell base station and extracts identity information of the target femto cell base station form the system information. In accordance with an embodiment of the present invention, the system information includes a Master Information Block (MIB) or an SIB. Although a description is provided below with the system information being the SIB, the present invention is not limited thereto.

In accordance with an embodiment of the present invention, the identity information of the target femto cell base station can be an ECGI. Accordingly, although a description is provided below with the identity information being the CSG ID, the present invention is not limited thereto.

The femto cell identity information extractor 230A transfers the extracted identity information of the target femto cell base station to the access-allowed femto cell determiner 230B.

The access-allowed femto cell determiner 230B receives the identity information of the target femto cell base station from the femto cell identity information extractor 230A and compares the identity information of the target femto cell base station to IDs stored in the access-allowed CSG list to determine whether the target femto cell base station is an access-allowed femto cell base station.

When the target femto cell base station is an access-allowed femto cell base station, the measurement report message generator 230C generates a measurement report including the identity information received from the target femto cell base station. The measurement report message generator 230C transmits the generated measure report message to the serving base station.

Figure 3:
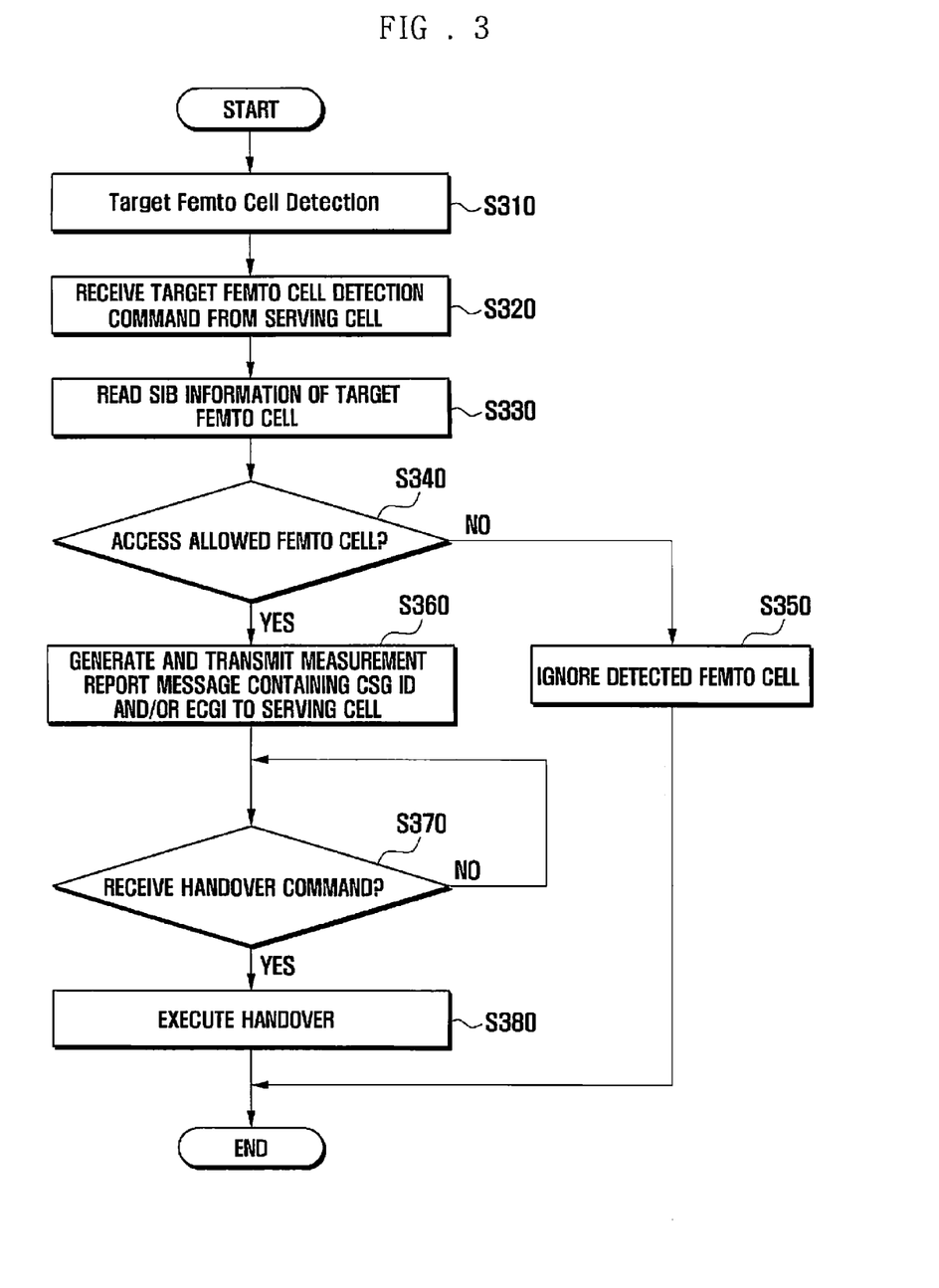
FIG. 3 is a flowchart illustrating a handover method of a UE in a wireless communication system according to an embodiment of the present invention.

FIG. 3 is a flowchart illustrating a handover method of a UE in a wireless communication system according to an embodiment of the present invention.

Referring to FIG. 3, when a handover is required, the UE 150 detects a target femto cell base station in step S310. In step S320, the UE 150 reports the detection of the target femto cell base station to the serving base station and receives a target femto cell detection command from the serving base station. In step S330, the UE 150 receives an SIB broadcasted by the target femto cell base station and acquires identity information of the target femto cell base station from the SIB. Here, the identity information of the femto cell base station is a CSG ID.

In step S340, the UE 150 compares the identity information of the target femto cell base station with a femto cell list included in an access-allowed list to determine whether the target femto cell is an access-allowed femto cell. If the target femto cell is an access-allowed femto cell, the UE 150 generates a measurement report message including the acquired identity information (CSG ID) and sends the measurement report message to the serving base station in step S360. However, if the target femto cell is not an access-allowed femto cell, the UE 150 ignores the detected femto cell in step S350.

After sending the measurement report message to the serving base station in step S360, the UE 150 waits to receive a handover command in step S370. When a handover command has been received, the UE 50 performs the handover to the detected femto cell base station in step S380.

Figure 4:
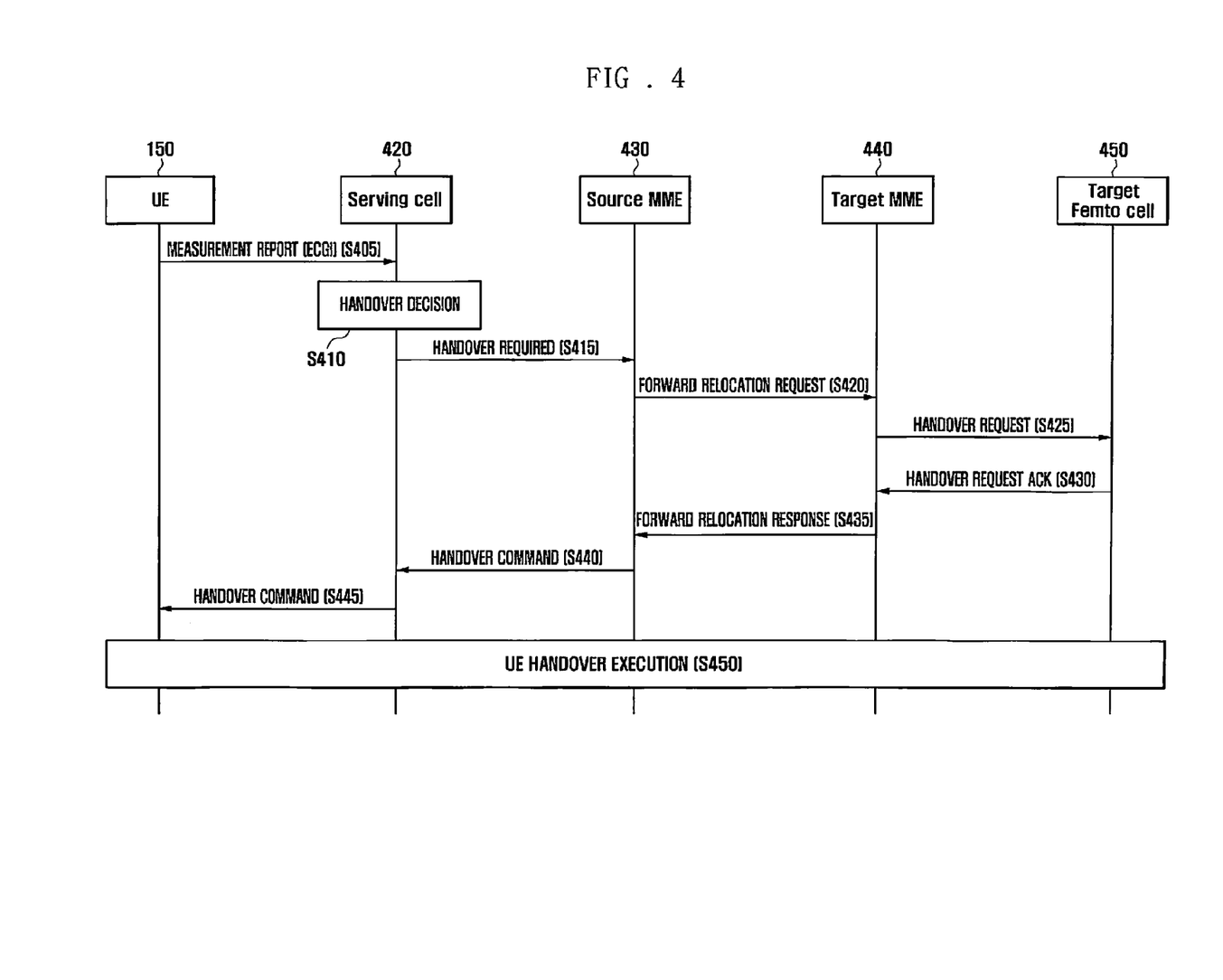
FIG. 4 is a sequence diagram illustrating operations of network entities when a UE performs a handover to a femto cell base station according to an embodiment of the present invention.

FIG. 4 is a sequence diagram illustrating operations of network entities when a UE performs a handover to a femto cell base station according to an embodiment of the present invention. More specifically, in the embodiment illustrated in FIG. 4, information on a target femto cell base station is included in a Neighbor Relation Table (NRT).

Referring to FIG. 4, a serving base station 420 stores information about neighbor femto cell base stations (such as PCI, CSG ID, ECGI, and TAC of each neighbor femto cell base station) in an NRT. The serving base station 420 receives an access allowed list from an MME 430 and stores the access allowed list in a storage unit therein.

The serving base station 420 first receives the ECGI of the target femto cell base station 450 in a Measurement Report message transmitted by the UE 150 in step S405. The ECGI is an identifier mapped to a femto cell base station for uniquely identifying the femto cell base station. The serving base station 420 stores the ECGI within the NRT.

After the Measurement Report message has been received, the serving base station 420 checks whether a CSG ID of a target femto cell is included in the allowed CSG list of the UE 150 and if it is included, makes a decision to handover the UE 150 to the target femto cell base station 450 in step S410. In step S415, the serving base station 420 sends a Handover Required message to the source MME 430.

Alternatively, when the serving base station 420 does not include an allowed CSG list, step S410 is omitted, and the source MME 430 is able make a handover decision, after it receives the Handover Required message.

When required, the source MME 430 can send a Forward Relocation Request message to a target MME 440 to which the target femto cell base station 450 is connected in step S420. However, when the target femto cell base station 450 is managed by the source MME 430, there is no need to transmit the Forward Relocation message.

In step S425, the target MME 440 sends a Handover Request message to the target femto cell base station 450.

Upon receipt of the Handover Request message, the target femto cell base station 450 sends a Handover Request Acknowledgement (ACK) message to the target MME 440 in step S430.

In step S435, the target MME 440 sends a Forward Relocation Response message to the source MME 430, and in step S440, the source MME sends a Handover command to the serving cell 420.

Upon receipt of the Handover command, the serving cell 420 forwards the Handover command to the UE 150 in step S445.

In step S450, the UE 150 performs the handover to the target femto cell base station 450.

Figure 5:
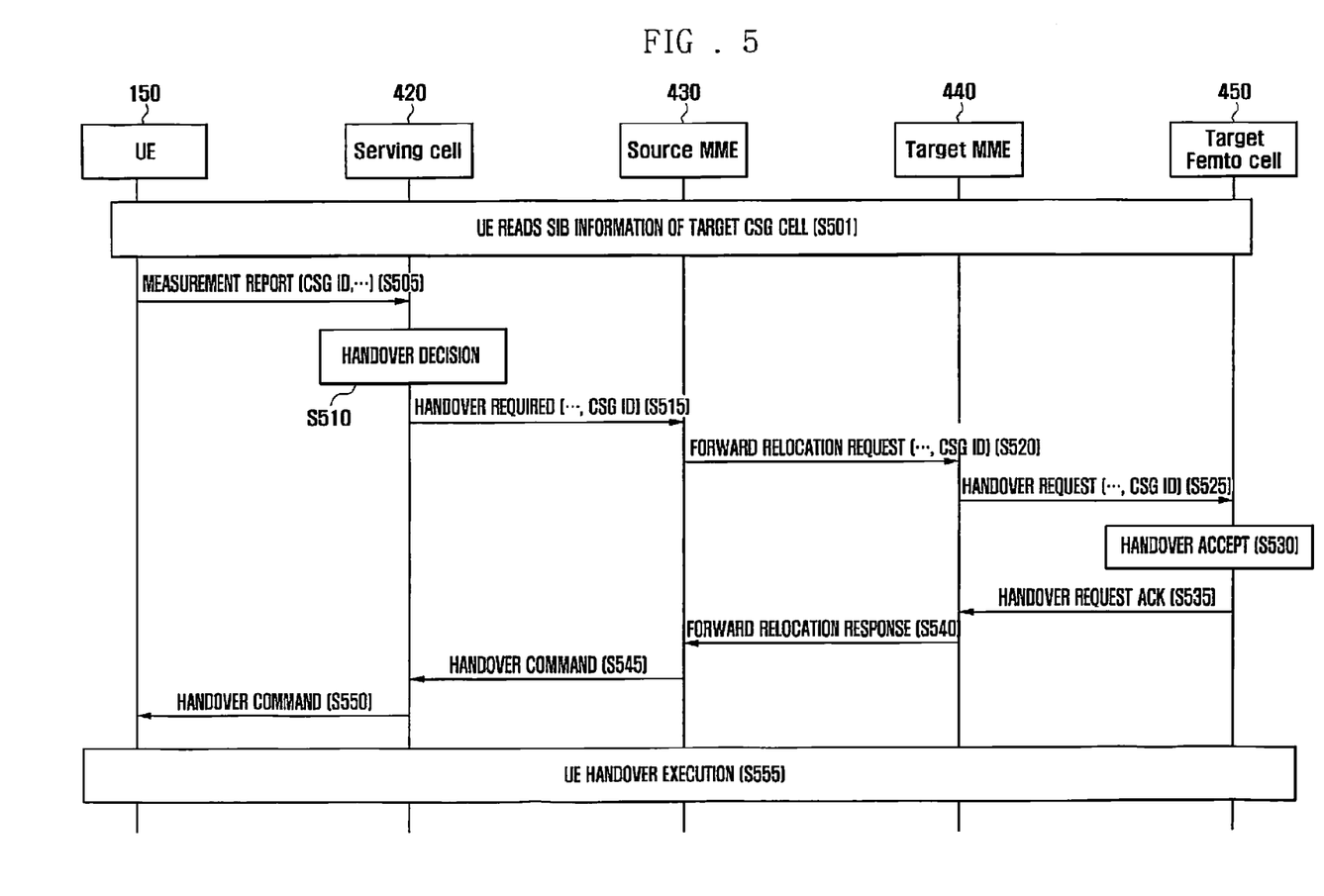
FIG. 5 is a sequence diagram illustrating operations of network entities when a UE performs a handover to a femto cell base station according to an embodiment of the present invention.

FIG. 5 is a sequence diagram illustrating operations of network entities when a UE performs a handover to a femto cell base station according to an embodiment of the present invention. More specifically, in the embodiment illustrated in FIG. 5, information on a target femto cell base station is not included in an NRT of a serving base station.

Referring to FIG. 5, the serving base station 420 does not store the information about the neighbor femto cell base stations in an NRT. Instead, the serving base station 420 receives an allowed CSG list from the source MME 130 and stores the allowed CSG list. The allowed CSG list includes information about neighbor femto cells that allow access of the UE 150.

In step S501, when a handover is required, the UE 150 receives an SIB broadcast by a target femto cell base station 450. The UE 150 can receive the SIB in response to a command transmitted by the serving base station 420 or according to its own decision.

The UE 150 acquires identity information of the target femto cell base station 450 from the received SIB; for example, the identity information of the target femto cell base station 450 being the CSG ID used by the target femto cell base station 450. Thereafter, the UE 150 compares the identity information of the target femto cell base station with values included in the allowed CSG list to determine whether the target femto cell base station 450 allows access by the UE 150. If the target femto cell base station 450 is an access allowed femto cell base station, the UE 150 sends a Measurement Report message including the identity information of the target femto cell base station 450, ECGI, and TAI to the serving base station 420 in step 505.

Alternatively, the identity information of the target femto cell base station 450 can be sent by some other message than a Measurement Report message.

After receiving the Measurement Report message, the serving base station 420 checks whether the identity information of the target femto cell base station 450 is included in the allowed CSG list. If the identity information of the target femto cell base station 450 is included in the allowed CSG list, the serving base station 420 makes a decision to handover the UE to the target femto cell base station 450 in step S510. Here, the handover decision can mean the handover initiation and access control.

In step S515, the serving base station sends a Handover Required message to a source MME 430 located on a core network. The Handover Required message includes the identity information of the target femto cell base station 450.

Alternatively, when the serving base station 420 does not include an allowed CSG list, step S510 is omitted, and the source MME 430 can make a handover decision when it receives the Handover Required message.

When required, the source MME 430 can send a Forward Relocation Request message including the identity information of the target femto cell base station 450 to the target MME 440 to which the target femto cell base station 450 is connected in step S520. However, when the target femto cell base station 450 is managed by the source MME 430, there is no need to transmit a Forward Relocation message.

In step S525, the target MME 440 sends a Handover Request message including the identity information of the target femto cell base station 450 to the target femto cell base station 450.

At this point, the target femto cell base station 450 verifies the identity information that is provided to the serving base station from the UE. More specifically, in step S530, because the identity information of a target femto cell base station can be changed at any time and the identity information reported by the UE 150 is not completely reliable, the target femto cell base station 450 compares the identity information (i.e., the CSG ID sent from the UE to the serving base station) with its own identity information (i.e., its current CSG ID) to determine whether they correspond.

If the identity information correspond with each other, the target femto cell base station 450 accepts the handover thereto and sends a Handover Request ACK message to the target MME 440 in step S535. However, if the identity information do not correspond with each other, the target femto cell base station sends a Handover Failure message to the target MME 440, notifying the UE 150 of the rejection on the handover.

In step S540, the target MME 440 sends a Forward Relocation Response message to the source MME 430, in step S545, the source MME 430 sends a Handover command to the serving base station 420, and in step S550, the serving base station 420 forwards the Handover command to the UE 150.

In step S555, the UE 150 performs the handover to the target femto cell base station 450.

Thereafter, other information related to the handover and mobility control of the UE 150 within the network can be transmitted to the serving base station 420 by means of the Measurement Report message.

Figure 6:
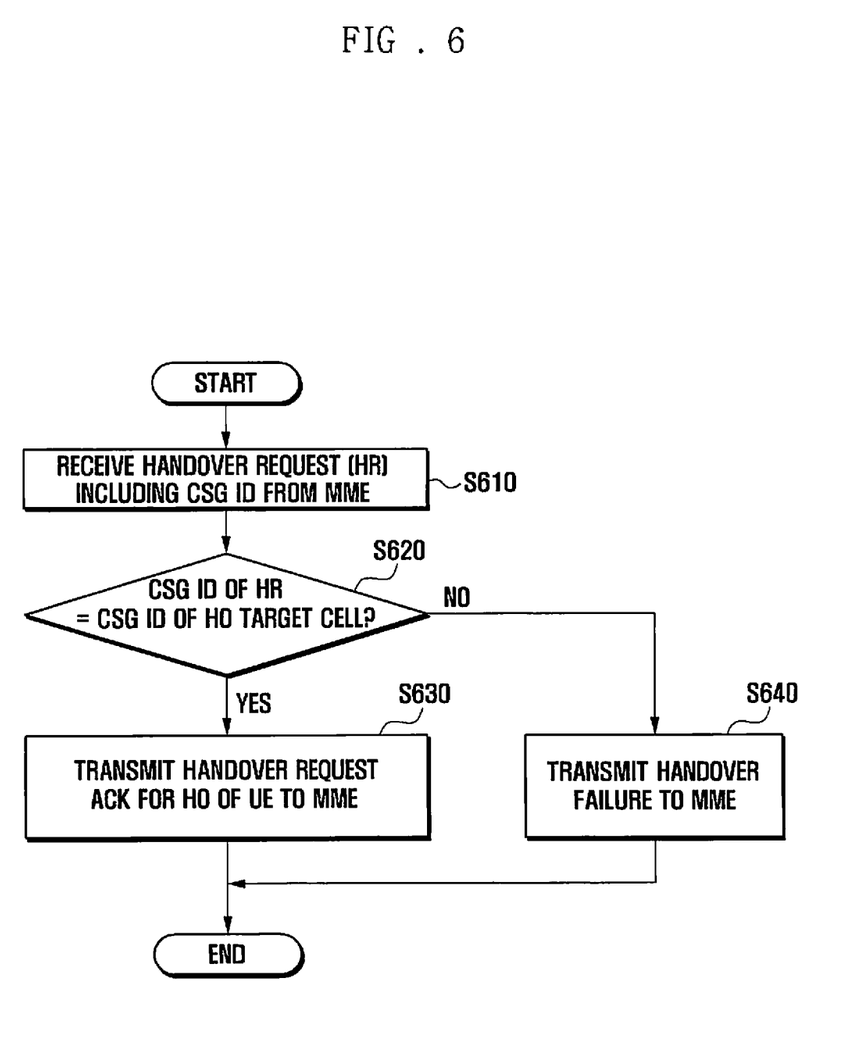
FIG. 6 is a flowchart illustrating operations of a target femto cell base station in the handover procedure illustrated in FIG. 5.

FIG. 6 is a flowchart illustrating operations of a target femto cell base station in a handover procedure as illustrated in FIG. 5.

Referring to FIG. 6, the target femto cell base station 450 receives a Handover Request message including identity information (e.g., CSG ID) of the target femto cell base station from the serving MME 430 or the target MME 440 in step S610. In step S620, the target femto cell base station 450 determines whether the identity information contained in the Handover Request message corresponds with its current identity information. That is, the target femto cell base station 450 determines whether the CSG ID reported from the UE 150 to the serving base station matches its current CSG ID.

When the received CSG ID matches with the current CSG ID, this means that the target femto cell base station 450 has been successfully detected by the UE 150, and thus, the target femto cell base station 450 sends a Handover Request ACK message to the corresponding MME in step S630. However, when the received CSG ID does not match with the current CSG ID, this means that the UE 150 has reported incorrect identity information to its serving base station, and thus, the target femto cell base station 450 sends a Handover Failure message to the corresponding MME, notifying that the handover attempt has been rejected, in step S640.

Figure 7:
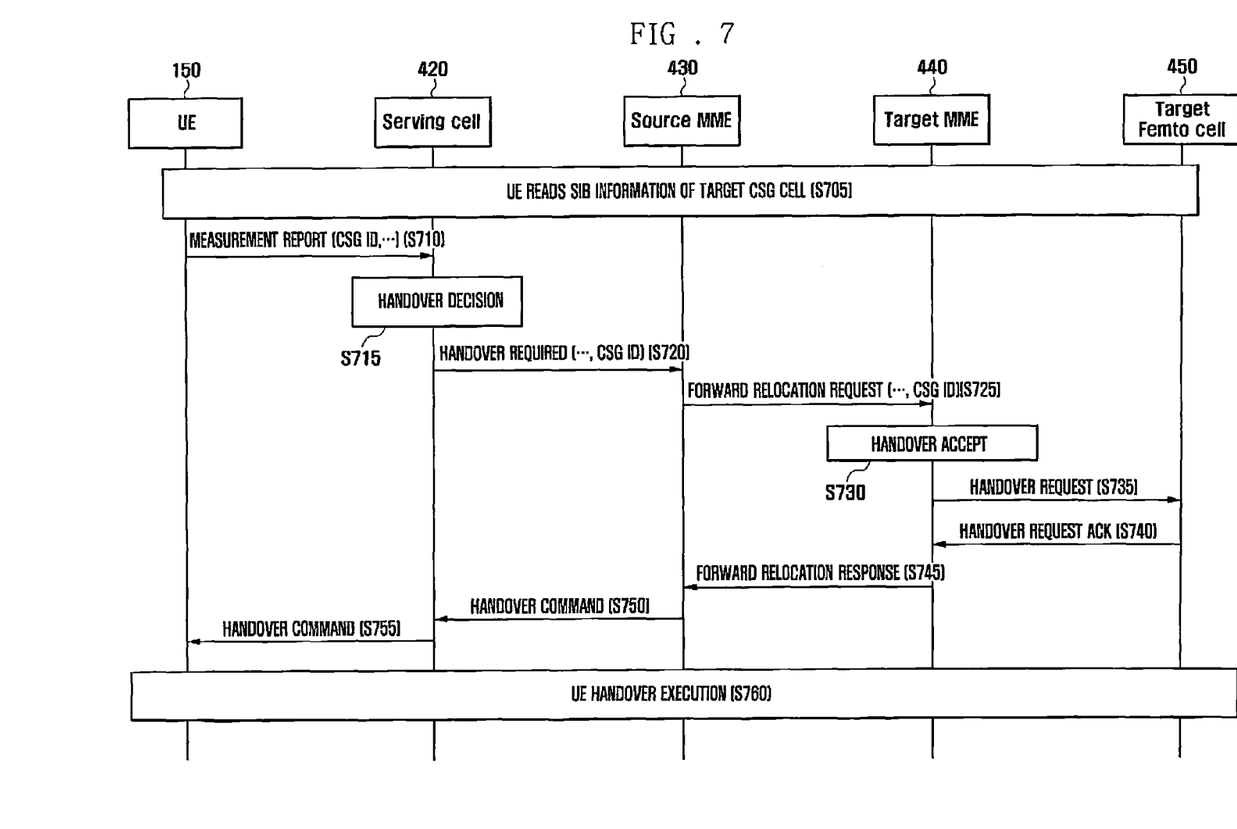
FIG. 7 is a sequence diagram illustrating operations of network entities when a UE performs a handover to a femto cell base station according to an embodiment of the present invention.

FIG. 7 is a sequence diagram illustrating operations of network entities when a UE performs a handover to a femto cell base station according to the third embodiment of the present invention. More specifically, in the embodiment illustrated in FIG. 7, information on a target femto cell base station is not included in an NRT of a serving base station and a target MME knows the identity information of the target femto cell base station.

Referring to FIG. 7, the serving base station 420 does not store the information about the neighbor femto cell base stations in an NRT. Instead, the serving base station 420 receives an allowed CSG list including information about the neighbor femto cells that allow the access of the UE 150. Further, the target MME 440 knows the identity information (i.e., CSG ID) of the target femto cell base station 450.

When a handover is required, the UE 150 receives an SIB broadcast by the target femto cell base station 450 in step S705. The UE 150 can receive the SIB in response to a command transmitted by the serving base station 420 or according to its own decision.

The UE 150 determines whether the target femto cell base station 450 is a femto cell that allows access by the UE 150 based on the received identity information (i.e., CSG ID). If the target femto cell base station 450 is an access allowed femto cell base station, the UE 150 sends a Measurement Report message including the identity information of the target femto cell base station 450 to the serving base station 420 in step S710.

Alternatively, the identity information of the target femto cell base station 450 can be sent by some other message than a Measurement Report message.

After the Measurement Report message has been received, the serving base station 420 checks whether the identity information of the target femto cell base station 450 is included in the allowed CSG list. If the identity information of the target femto cell base station 450 is included in the allowed CSG list, the serving base station 420 makes a decision to handover the UE 150 to the target femto cell base station 450 in step S715 and sends a Handover Required message to the source MME 430 in step S720. The Handover Required message includes the identity information of the target femto cell base station 450, such as CSG ID, ECGI, and TAI.

Alternatively, when the serving vase station 420 does not include an allowed CSG list, step S715 is omitted, and the source MME 430 can make a handover decision when it receives the Handover Required message.

When required, the source MME 430 sends a Forward Relocation Request message including the identity information of the target femto cell base station 450 to the target MME 440 to which the target femto cell base station 450 is connected in step S725. However, when the target femto cell base station 450 is managed by the source MME 430, there is no need to transmit a Forward Relocation message.

In FIG. 7, it is assumed that each femto cell base station has a single cell and the target MME 440 has the identity information of all the femto cell base stations.

In step S730, the target MME 440 verifies the target femto cell base station 450 by comparing the identity information of the target femto cell base station to which the UE 150 attempts handover and the actual identity information of the target femto cell base station 450. When two identity information correspond with each other, the handover procedure continues. However, when the two identity information do not correspond with each other, a handover failure is notified to the UE with the handover rejection of the target MME 440.

When it has been determined that the two identity information correspond with each other at step S730, the target MME 440 sends a Handover Request message to the target femto cell base station 450 in step 735, and the target femto cell base station 450 sends a Handover Request ACK message notifying acceptance of the handover to the target MME 440 in response to the Handover Request message in step S740.

In step S745, the target MME 440 sends a Forward Relocation Response message to the source MME 430, in step S750, the source MME 430 sends a Handover command to the service base station 420, and in step S755, the serving base station 420 forwards the Handover command to the UE 150.

In step S760, the UE 150 performs the handover to the target femto cell base station 450.

Thereafter, other information related to the handover and mobility control of the UE 150 within the network can be transmitted to the serving base station 420 by means of the Measurement Report message.

Figure 8:
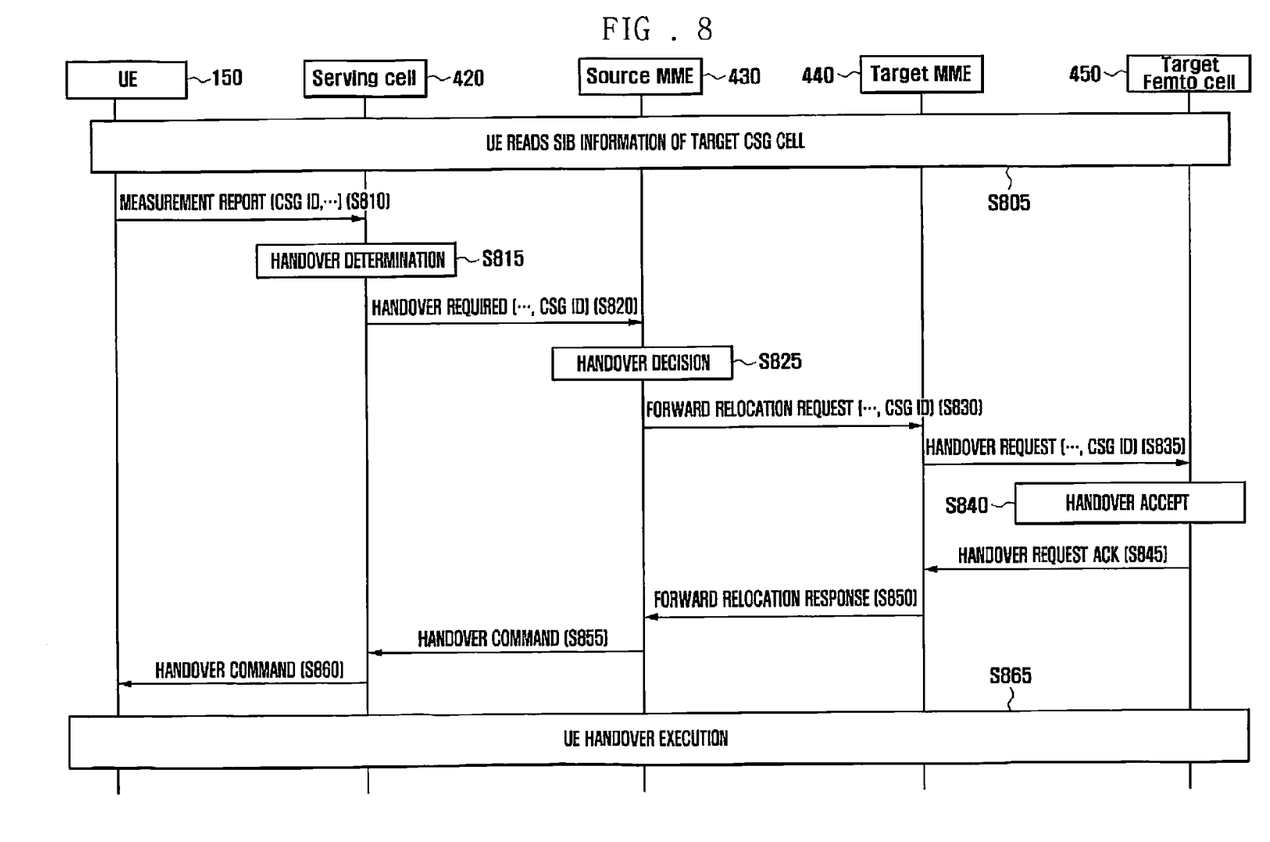
FIG. 8 is a sequence diagram illustrating operations of network entities when a UE performs a handover to a femto cell base station according to an embodiment of the present invention.

FIG. 8 is a sequence diagram illustrating operations of network entities when a UE performs a handover to a femto cell base station according to an embodiment of the present invention. More specifically, in the embodiment illustrated in FIG. 8, information on a target femto cell base station is not included in an NRT of a serving base station.

Referring to FIG. 8, the serving base station 420 does not store the information about the neighbor femto cell base stations in an NRT, and does not store an allowed CSG list.

When a handover is required, the UE 150 receives an SIB broadcast by the target femto cell base station 450 in step S805. The UE 150 can receive the SIB in response to a command transmitted by the serving base station 420 or according to its own decision.

The UE 150 determines whether the target femto cell base station 450 is a femto cell that allows access by the UE 150 based on received identity information (i.e., CSG ID). If the target femto cell base station 450 is an access allowed femto cell base station, the UE 150 sends a Measurement Report message including the identity information of the target femto cell base station 450, such as CSG ID, ECGI, and TAI, to the serving base station 420 in step S810.

Alternatively, the identity information of the target femto cell base station 450 can be sent by some other message than a Measurement Report message.

After the Measurement Report message has been received, the serving base station makes a handover decision for the UE 150 in step S815 or sends a Handover Required message to request for the source MME 430 in step S820, and the source MME 430 makes a handover decision in step S825.

As described above, the serving base station 420 has no allowed CSG list and thus, can only determine the handover execution (i.e., handover initiation) and leaves the handover decision to the MME in a core network.

More specifically, the serving base station 420 transmits the identity information of the target femto cell base station 450 to the source MME 430, and in step S825, the source MME 430 checks whether the CSG ID of the target femto cell base station 450 is included in the allowed CSG list of the UE 150 to make a handover decision. When the CSG ID of the target femto cell base station 450 is included in the allowed CSG list of the UE 150, the handover is performed, and when the CSG ID of the target femto cell base station 450 is not included in the allowed CSG list of the UE 150, the handover is not performed.

When required, the source MME 430 sends a Forward Relocation Request message including the identity information of the target femto cell base station 450 to the target MME 440 to which the target femto cell base station is connected in step S830. However, when the target femto cell base station 450 is managed by the source MME 430, there is no need to transmit a Forward Relocation message In step S835, the target MME 440 sends a Handover Request message including the identity information of the target femto cell base station 450 to the target femto cell base station 450.

Again, the target femto cell base station 450 verifies the identity information of the target femto cell base station 450 that is provided to the serving base station from the UE 150, because the identity information of the target femto cell base station 450 can be changed at any time and the identity information reported by the UE 150 is not completely reliable.

Accordingly, in step S840, the target femto cell base station 450 compares the identity information (i.e., the CSG ID sent from the UE to the serving base station) with its own identity information (i.e., a current CSG ID) to determine whether to correspond with each other. If the identity information correspond with each other, the target femto cell base station 450 accepts the handover thereto and sends a Handover Request ACK message to the target MME 440 in step S845. However, if the identity information do not correspond with each other, the target femto cell base station 450 sends a Handover Failure message to the target MME 440, notifying the UE 150 of the rejection on the handover.

In step S850, the target MME 440 sends a Forward Relocation Response message to the source MME 430, in step S855, the source MME 430 sends a Handover command to the serving base station 420, and in step S860, the serving base station 420 forwards the Handover command to the UE 150.

In step S865, the UE 150 executes the handover to the target femto cell base station 450.

Thereafter, other information related to the handover and mobility control of the UE 150 within the network can be transmitted to the serving base station 420 using the Measurement Report message.

Figure 9:
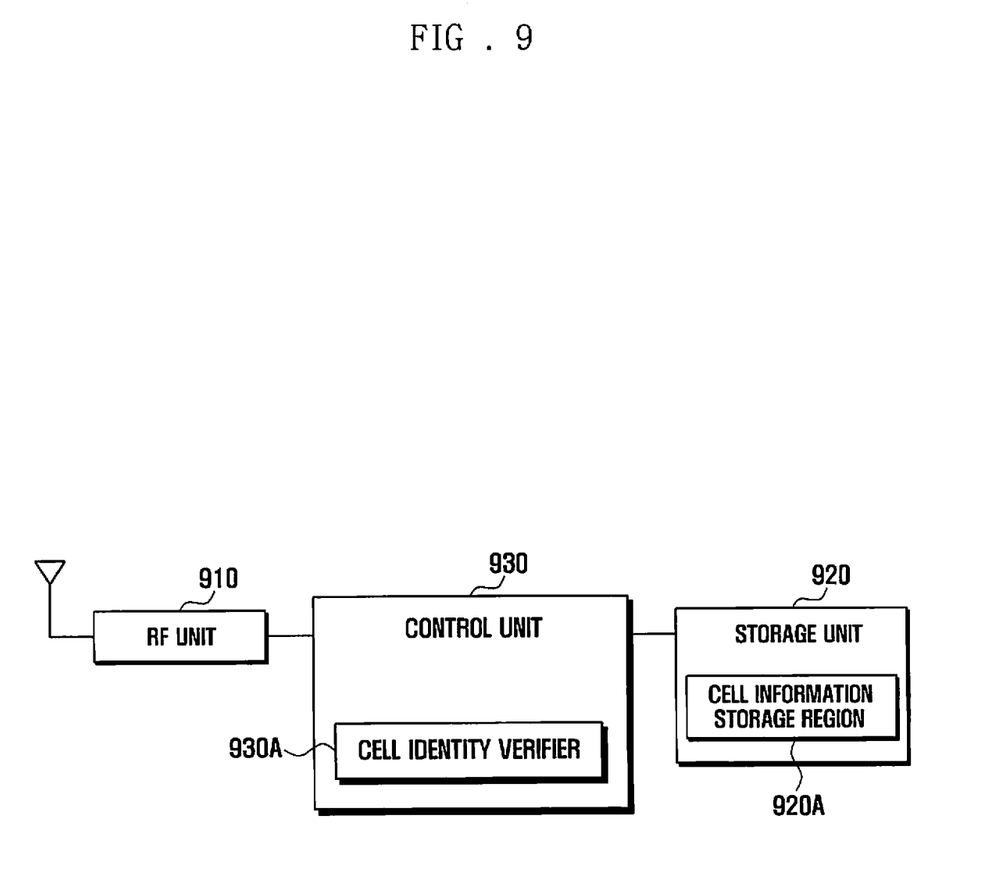
FIG. 9 is a block diagram illustrating a configuration of a femto cell base station for supporting handover procedures according to an embodiment of the present invention.

FIG. 9 is a block diagram illustrating a femto cell base station supporting a handover procedure according to an embodiment of the present invention.

Referring to FIG. 9, the femto cell base station includes an RF unit 910, a storage unit 920, and a control unit 930. The storage unit 920 includes a cell information storage region 920A, and the control unit 930 includes a cell identity verifier 930A.

The RF unit 910 includes an RF transceiver and a duplexer (not shown) and is responsible for processing RF signals. The RF unit 910 receives the Handover Request message transmitted by the source MME 430 or the target MME 440. Here, the Handover Request message can carry the identity information of the target femto cell base station 450 to which the UE 150 attempts to access.

The storage unit 920 stores application programs and data related to operations of the target femto cell base station 450. Further, the cell information storage region 920A including in the storage unit 920 stores the cell information of the target femto cell base station. The cell information includes ECGI, CSG ID, and TAI of the target femto cell base station 450.

The control unit 930 controls the overall operations of the femto cell base station. The control unit 930 controls the RF unit 910 to receive and process the Handover Request message transmitted by the source MME 430 or the target MME 440. If the Handover Request message has been received, the control unit 930 extracts the identity information of the target femto cell base station 450 from the Handover Request message and sends the identity information to the cell identity verifier 930A.

The cell identity verifier 930A compares the identity information (i.e., a CSG ID) that the UE 150 reports to its serving base station 420 with current identity information of the femto cell base station 450 to determine whether they correspond with each other. If the two CSG IDs correspond with each other, the cell identity verifier 930A accepts the handover and controls the femto cell base station 450 to send the Handover Request ACK message to the target MME 440 or the source MME 430.

However, if the two CSG IDs do not correspond with each other, the cell identity verifier 930A sends a Handover Failure message, notifying that the handover of the UE 150 has been rejected.

As described above, the handover method and apparatus of the present invention facilitates a handover of a UE to a femto cell in a wireless communication system supporting both the femto and macro cells.

Although certain embodiments of the present invention have been described in detail hereinabove, it should be clearly understood that many variations and/or modifications of the basic inventive concepts taught herein, which may appear to those skilled in the present art, will still fall within the spirit and scope of the present invention, as defined in the appended claims.

What is claimed is:

1. A handover method of a User Equipment (UE) in a wireless communication system including a Home eNodeB (HeNB), the method comprising:
   receiving system information including a Cell IDentification (ID), a Tracking Area ID (TAI) and a CSG (Closed Subscriber Group) ID, from a target HeNB;
   generating and sending a measurement report, the measurement report including the Cell ID, Tracking Area ID (TAI) and CSG (Closed Subscriber Group) ID of the target HeNB;
   receiving a Handover Command message from a source eNB; and
   performing a handover to the target HeNB,
   wherein the CSG ID included in the measurement report is compared, by the target HeNB, with a CSG ID broadcast in the target HeNB to verify whether the CSG ID in the measurement report matches a CSG ID broadcast in the target HeNB.

2. The handover method of claim 1, further comprising:
   receiving a configuration, for receiving the system information of the target HeNB, from the source eNB.

3. The handover method of claim 1, wherein the Handover Command message is received from the source eNB, when the CSG ID transmitted to the source eNB is verified.

4. The handover method of claim 3, wherein it is verified, by the target HeNB, whether the CSG ID in the measurement report matches the CSG ID broadcast in the target HeNB.

5. The handover method of claim 1, further comprising:
   after receiving system information, identifying whether the UE is a member of the target HeNB; and
   sending the measurement report to the source eNB when the UE is a member of the target HeNB.

6. The handover method of claim 1, wherein the measurement report further comprises a member indication.

7. The handover method of claim 1, wherein the CSG ID is used for access control by a Mobility Management Entity (MME).

8. A handover supporting method of a Mobility Management Entity (MME) in a wireless communication system including a Home eNodeB (HeNB), the method comprising:
- receiving a Handover Required message, including a CSG (Closed Subscriber Group) IDentification (ID) of a target HeNB for a User Equipment (UE) and target Cell ID, from a source eNB;
- performing UE access control to the HeNB based on the CSG ID received in the Handover Required message and stored CSG subscription data for the UE;
- sending a Handover Request message, including the CSG ID of the target HeNB, to the target HeNB; and
- sending a Hanover Command message to the source eNB when receiving a Handover Request Acknowledgement (Ack) message from the target HeNB,
- wherein the CSG ID included in the Handover Required message is compared, by the target HeNB, with a CSG ID broadcast in the target HeNB to verify whether the CSG ID in the Handover Required message matches the CSG ID broadcast in the target HeNB.

9. The handover supporting method of claim 8, wherein it is verified, by the target HeNB, whether the CSG ID in the measurement report matches the CSG ID broadcast from the target HeNB.

10. A handover supporting method of a Home eNodeB (HeNB) in a wireless communication system, the method comprising:
- receiving a Handover Request message, by the home eNB, including a CSG (Closed Subscriber Group) ID acquired by a User Equipment (UE), from a Mobility Management Entity (MME);
- comparing the CSG ID included in the Handover Request message with a CSG ID broadcast in the HeNB to verify whether the CSG ID included in the Handover Request message matches the CSG ID broadcast in the HeNB; and
- sending a Handover Request Acknowledgement (Ack) message to the MME when the CSG ID included in the Handover Request message matches the CSG ID broadcast in the HeNB.

11. The handover supporting method of claim 10, further comprising:
- broadcasting system information comprising a Cell ID, a Tracking Area ID (TAI) and a CSG ID of the HeNB.

12. A User Equipment (UE) performing a handover in a wireless communication system including a Home eNB (HeNB), the UE comprising:
- a transceiver configured to transmit and receive a signal; and
- a controller configured to receive system information including a Cell IDentification (ID), Tracking Area ID (TAD, and CSG (Closed Subscriber Group) ID, from a target HeNB, to generated and send a measurement report to a source eNB, the measurement report including the Cell ID, Tracking Area ID (TAI) and CSG (Closed Subscriber Group) ID of the target HeNB, to receive a Handover Command message from the source eNB, and to perform a handover to the target HeNB,
- wherein the CSG ID included in the measurement report is compared, by the target HeNB, with a CSG ID broadcast in the target HeNB to verify whether the CSG ID in the measurement report matches the CSG ID broadcast in the target HeNB.

13. The UE of claim 12, wherein the controller is configured to identify whether the UE is a member of the target HeNB, and to send the measurement report to the source eNB when the UE is a member of the target HeNB.

14. The UE of claim 12, wherein the measurement report further comprises a member indication.

15. The UE of claim 12, wherein the CSG ID is used for access control by a Mobility Management Entity (MME).

16. The UE of claim 12, wherein the controller is configured to receive a configuration from the source eNB, for receiving the system information of the target HeNB.

17. The UE of claim 12, wherein the Handover Command message is received from the source eNB, when the CSG ID transmitted to the source eNB is verified.

18. The UE of claim 17, wherein it is verified, by the target HeNB, whether the CSG ID in the measurement report matches the CSG ID broadcast in the target HeNB.

19. A Mobility Management Entity (MME) supporting a handover of a User Equipment (UE) in a wireless communication system including a Home eNB (HeNB), the MME comprising:
- a transceiver configured to transmit and receive a signal; and
- a controller configured to receive a Handover Required message, including a CSG (Closed Subscriber Group) ID of a target HeNB for a User Equipment (UE) and target Cell ID, from a source eNB, to perform UE access control to the HeNB based on the CSG ID received in the Handover Required message and stored CSG subscription data for the UE, to send a Handover Request message, including the CSG ID of the target HeNB, to the target HeNB, and to send a Hanover Command message to the source eNB when receiving a Handover Request Acknowledgement (Ack) message from the target HeNB,
- wherein the CSG ID included in the Handover Required message is compared, by the target HeNB, with a CSG ID broadcast in the target HeNB to verify whether the CSG ID in the Handover Required message matches the CSG ID broadcast in the target HeNB.

20. The MME of claim 19, wherein it is verified, by the target HeNB, whether the CSG ID in the measurement report matches the CSG ID broadcast from the target HeNB.

21. A Home eNB (HeNB) supporting a handover of a User Equipment (UE) in a wireless communication system, the HeNB comprising:
- a transceiver configured to transmit and receive a signal; and
- a controller configured to receive a Handover Request message, by the Home eNB, including a CSG (Closed Subscriber Group) IDentification (ID) acquired by a User Equipment (UE) from a Mobility Management Entity (MME), to compare the CSG ID included in the Handover Request message with a CSG ID broadcast in the HeNB to verify whether the CSG ID included in the Handover Request message matches the CSG ID broadcast in the HeNB, and to send a Handover Request Acknowledgement (Ack) message to the MME when the CSG ID included in the Handover Request message matches the CSG ID broadcast in the HeNB.

22. The HeNB of claim 21, wherein the CSG ID is used for access control by the MME.

23. The HeNB of claim 21, wherein the controller is configured to broadcast system information including a Cell ID, Tracking Area ID (TAI) and CSG ID of the HeNB.

* * * * *